United States Patent [19]

Gueldenpfennig et al.

[11] 4,166,199
[45] Aug. 28, 1979

[54] ATTENDANT CONSOLE COMPLEX

[75] Inventors: Klaus Gueldenpfennig, Penfield; Charles J. Breidenstein, Rochester, both of N.Y.

[73] Assignee: Stromberg-Carlson Corporation, Tampa, Fla.

[21] Appl. No.: 854,639

[22] Filed: Nov. 25, 1977

[51] Int. Cl.² ............................................. H04M 3/62
[52] U.S. Cl. .................................................. 179/27 CA
[58] Field of Search ............... 179/99, 27 FF, 27 CA, 179/27 FC

[56] References Cited
U.S. PATENT DOCUMENTS

| 3,322,907 | 5/1967 | Browne et al. | 179/27 CA X |
| 3,935,396 | 1/1976 | Barselotti et al. | 179/99 |
| 4,046,972 | 9/1977 | Huizinga et al. | 179/99 |

Primary Examiner—William C. Cooper
Attorney, Agent, or Firm—Michael F. Oglo

[57] ABSTRACT

An operator complex in which control signals relating to key lamp and alphanumeric display operation and key transition data are carried between the operator console and the PABX system on a multiplex highway or radio transmission link to permit virtually unlimited spacing between the operator console and the associated switching system. The operator console includes a send control system and a receive control system. The send control system detects valid key transitions and formulates a message concerning such detected key transmissions to be sent to the common control in the PABX. The receive control system receives messages from the common control indicating key lamp or alphanumeric display information and decodes these messages to effect selective control over the display.

22 Claims, 17 Drawing Figures

FIG. 6.

KEY MEMORY STATES AND TRANSITION TABLE

| SEQUENCE NUMBER | OLD KEY STATE | KEY* STATUS | NEW KEY STATE | ACTION TAKEN | COMMENTS |
|---|---|---|---|---|---|
| 0 | 0 | 0 | 0 | NONE | IDLE OPEN |
| 1 | 0 | 1 | 1 | NONE | ENTER DEBOUNCE 1 |
| 2 | 1 | 0 | 0 | NONE | BACK TO IDLE OPEN |
| 3 | 1 | 1 | 2 | NONE | ENTER DEBOUNCE 2 |
| 4 | 2 | 0 | 0 | NONE | BACK TO IDLE OPEN |
| 5 | 2 | 1 | 3 | NONE | ENTER DEBOUNCE 3 |
| 6 | 3 | 0 | 0 | NONE | BACK TO IDLE OPEN |
| 7 | 3 | 1 | 4 | SEND CLOSURE | ENTER IDLE CLOSED |
| 8 | 4 | 0 | 5 | NONE | ENTER DEBOUNCE 4 |
| 9 | 4 | 1 | 4 | NONE | BACK TO IDLE CLOSED |
| 10 | 5 | 0 | 6 | NONE | ENTER DEBOUNCE 5 |
| 11 | 5 | 1 | 4 | NONE | BACK TO IDLE CLOSED |
| 12 | 6 | 0 | 7 | NONE | ENTER DEBOUNCE 6 |
| 13 | 6 | 1 | 4 | NONE | BACK TO IDLE CLOSED |
| 14 | 7 | 0 | 0 | SEND CLOSURE | ENTER IDLE OPEN |
| 15 | 7 | 1 | 4 | NONE | BACK TO IDLE CLOSED |

\* KEY STATUS: 0 = OPEN KEY (NON OPERATED)
1 = CLOSED KEY (OPERATED)

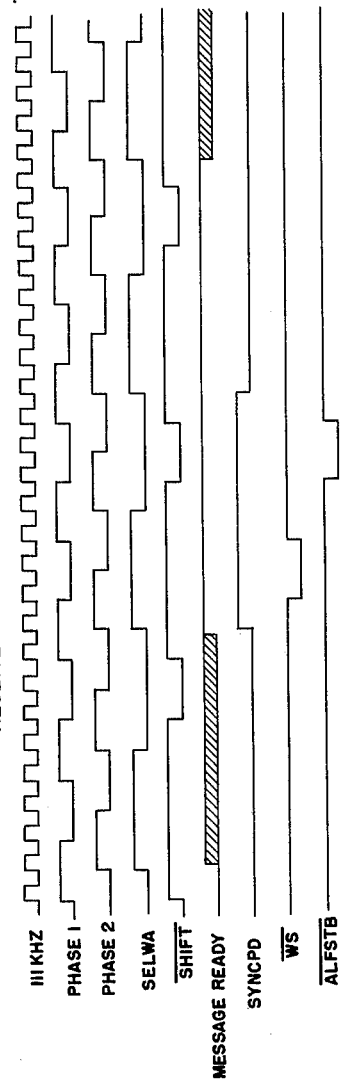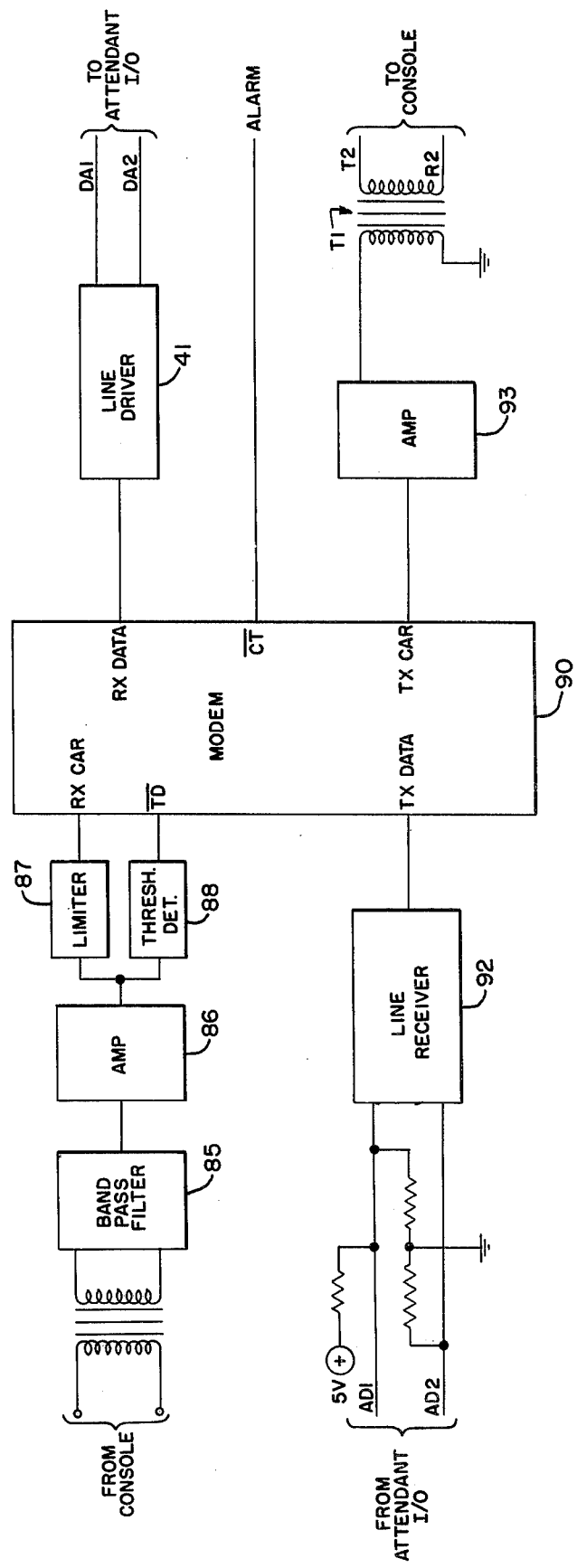

ATTENDANT CONSOLE COMPLEX

The present invention relates in general to telephone systems, and more particularly, to an operator complex for a private automatic branch exchange.

The operator's console in a PABX generally includes the standard twelve key operator keypad as well as a plurality of control keys for initiating various connections and operations within the system. In addition, the operator may be provided with a plurality of direct service keys which enable direct access to each of the stations within the PABX. For purposes of indicating the state of the various control functions and calls being handled within the PABX system, and the status of various control keys on the operator console, display lamps are normally provided in conjunction with all control keys, except for the keys of the operator keypad. In addition, an alphanumeric display may be provided on the console to provide a visual indication to the operator of the identity of the stations being accessed, as well as to display various messages applied to the operator console from the common control in the PABX system.

As the number of services and functions available within a system increase, it is generally necessary to provide a greater number of control keys at the operator console to initiate and control such services and functions. This not only increases the number of keys on the operator console, but also increases the number of display lamps which must be provided in association with the control keys. Also, as PABX systems increase in size, the number of direct service keys provided on the operator console becomes larger, each of these keys also requiring a display lamp for indicating the busy/free status of the associated station.

This large number of keys and lamps which must be controlled at the operator console has in the past provided a cabling problem in that it was necessary to provide a wire per lamp and key coming out of the console to the system. Thus, a large number of keys and lamps on the console would require a very large cable of wires, which limits the physical distance which may be provided between the console and the switching system. In this regard, the costs per foot of cable increase tremendously as the console is located further from the switching system. Of course, it is also apparent that the number of keys and lamps which may be controlled is also limited by the maximum physical permissible size of the cable provided between the console and the PABX system, so that these cabling problems also placed constraints on the design of the console.

In order to solve the cabling problems associated with prior operator complexes, the present invention utilizes a multiplex approach wherein control signals from the system to the console for controlling operation of the lamps and alphanumeric display and the operating conditions of the various keys on the console are multiplexed on a four wire bidirectional highway between the console and the PABX system. The use of the bidirectional multiplex highway completely eliminates the limits on the number of keys and lamps which may be provided on the console and greatly increases the distance at which the console may be located from the system. In the alternative, the link between the attendant console and the PABX system could be provided by radio transmission, in which case the distance which may be provided between the console and the system would be virtually unlimited. Thus, a large PABX system may be centrally located within a building, a complex of buildings, or in a given area and have a plurality of attendant consoles associated therewith which are located in various locations within the building, building complex, or the area serviced by the system.

The advantages of such remote location of the operator complexes are numerous. For example, the offices of diferent customers within an office building may be serviced by a single PABX system, with an operator complex being located in each customer office. In this way, a separate switching system would not be required for each customer, and by providing a PABX system of sufficient size within the building, the number of stations allocated to each customer would be specifically tailored to the needs of the customer. In addition, as a customer requires additional stations, such stations can be simply provided from the centrally located system. Of course, this concept can be expanded to a complex of buildings or to a given geographical area.

In accordance with another feature of this invention, the transmission of data between the operator console and the PABX system is effected by modulation/demodulation of the data into the voice frequency band by a frequency shift keying technique. Thus, a modem is provided in the operator console and in the attendant audio circuit in the PABX system to effect the necessary conversion of the data into FSK form on one end of the link and reconversion into digital form on the other end. The transmission mode is binary-synchronous bursts at approximately 600 BAUD, each burst or message containing transition information for a particular key, illuminator, or alpha-numeric display.

The electrical control portion of the operator console may be divided into two parts consisting of a send control system and a receive control system. The send control system is provided for the multiplexing of data concerning key transitions for modulation by the modem and transmission on the link between the console and the attendant audio circuit. The receive control system provides for decoding of messages from the common control received on the link between the attendant audio circuit and the operator console and demultiplexed by the modem. These messages include control signals for key lamp and alphanumeric display control.

In the send control system, each key function is scanned once every two milliseconds to determine its current condition (open or closed). Each time a key is addressed, its current condition is compared with a status readout of a random access memory (RAM) whose address is the scanner position. This status consists of three bits which combine with the current key condition to generate a new status, which is then stored in the RAM before the scanner advances. The algorithm which is used in the decoding of the key status information requires four consecutive same key conditions to be sensed after a change of state before the transition will be recognized as valid. If no transition is detected, the scanner advances to scan the next key.

If a transition is detected, the scanner stops and a message including the key transition data is formulated by a message serializer, which accepts the scanner position (key address) and an indication of the type of transition that has occurred (operation or release). The scanner is now released and resumes scanning. The serializer generates a sync character, an even parity bit, and shifts out the data through the modem onto the link with the attendant audio circuit.

The receive control system in the console includes a shift register which receives serial data from the system on the link between the attendant audio circuit and the operator console via the modem. The shift register is clocked during the center of each bit as determined by an edge-detector and local clock logic. This message includes a sync character, and two bytes of data relating to a lamp or alphanumeric character display address and an illuminator code, respectively. When the full message has been received, the sync character is detected and the message is accepted and acted upon provided proper parity is detected. The circuit is such that one sync character will always guarantee sync no matter what phase relation exists between the system clock and the console clock.

The second byte of the message received from the system includes the illuminator identity, i.e. a display lamp address or an alphanumeric display address. If the illuminator identity indicated by the second byte of the message indicates an address of one of the display lamps, a three bit flash code from the third byte of the message is written into a RAM whose address is the address provided by the second byte of the message. Interleaved with these random accesses of the RAM which write new flash codes into the RAM are sequential read accesses. During these read cycles, each of the illuminator flash codes is read out of the RAM and decoded to select one of a plurality of common timing signals. The proper timing signal is then sent along a common data line to an illuminator demultiplexor which consists of shift registers and edge-triggered latches. When a complete frame of data for addressing each of the display lamps has been shifted into the shift registers, the latches are clocked and the illuminators are updated. The fast frame rate associated with the control data results in illuminator flashing which faithfully follows the common flash timing sources.

If the second byte of the received message from the system provides the address of one of the alphanumeric displays, the data identifying the particular alphanumeric character to be displayed is provided in the third byte of the message. A PROM decodes the character code for driving the various displays.

A further feature of the present invention relates to a means within the operator console control circuitry for indicating to the system when parity error has been detected in a message, thereby indicating to the system that the message should be retransmitted. This is accomplished by assigning a ficticious key address to the parity function so that a closed key transition of the ficticious key indicates a parity error. For messages received in which a parity error is detected, the message will be ignored by the control circuitry in the operator console, which results in retransmission of the message.

Another feature of the present invention relates to a means within the operator console for providing to the common control in the PABX system data upon request which indicates that the console is operating and designating the state of each of the control keys. In the normal scanning of control keys by the send control system, only new transitions (opened to closed or closed to opened) will be communicated to the common control in the PABX system; however, in the event of a power failure or other loss of data within the common control of the system, it may be necessary to obtain the status of each of the keys in the operator console to renew this information in the common control. This is simply provided by circuitry within the operator console which responds to a request from the common control in the form of a message directed to another ficticious key to transmit the key status of the keys being scanned even though such key status has been previously communicated to the common control. In this way, the PABX system can restore its internal map of the various console status conditions.

It is therefore an object of the present invention to provide an operator complex for a PABX system which permits remote location of the operator console with respect to the system.

It is a further object of the present invention to provide an operator complex for a PABX system in which a minimum number of lines is required for connection between the operator console and the system.

It is still another object of the present invention to provide an operator complex for a PABX system which provides for a self-testing and communication of key status data upon request from the system.

It is another object of the present invention to provide an operator complex for a PABX system which is of a simplified construction, reduced cost, and is capable of providing simplified control over key functions and illuminator displays.

These and other objects, features, and advantages of the present invention will become more apparent from the following detailed description of the present invention when taken in conjunction with the accompanying drawings, which illustrate an exemplary embodiment of the present invention, and wherein:

FIG 6 is a table of key memory states and transitions;

FIGS. 13 and 14 are waveform diagrams of various signals appearing in the circuits of FIGS. 9 through 12;

FIG. 15 is a schematic block diagram of the control portion of the attendant audio circuit.

As will become apparent from the following detailed description of a preferred embodiment of the present invention, this invention is generally applicable to PABX systems; however, in order to facilitate an understanding of the operation of the present invention and the various features thereof, reference may be had to copending U.S. Application Ser. No. 885,181 filed Nov. 25, 1977 by Klaus Gueldenpfennig, et al, which application is assigned to the assignee in the present invention. Certain features of the system disclosed in the referenced application are mentioned herein to provide an environment within which operation of the exemplary embodiment may be described. However, such system features are mentioned only by way of example and should not be considered in any way to be a restriction on the general application of this invention to other systems of different type.

Figure 1A:
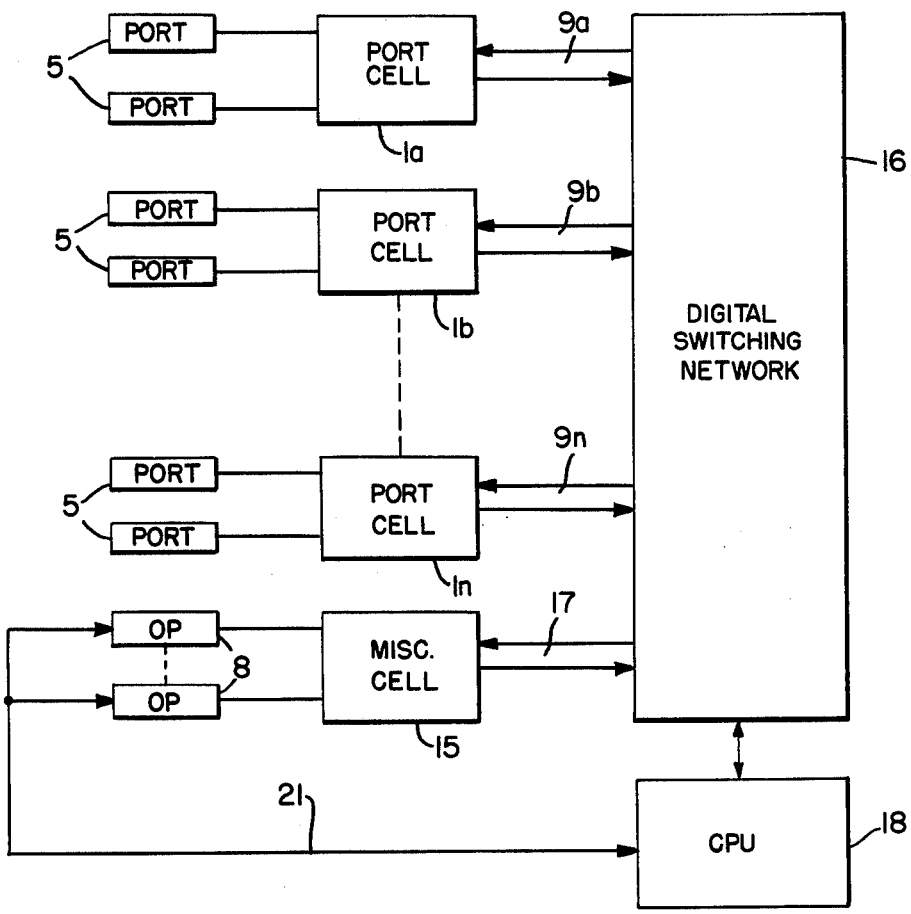
FIG. 1A is a schematic block diagram of a PABX system in which the present invention may be incorporated.

In FIG. 1A, which is a simplified block diagram of a PABX system of the above-referenced type to which the present invention is applicable, a plurality of ports 5 are connected in groups through respective port cells 1a–1n to a digital switching network 16 controlled by central processing unit 18. The ports 5, which may comprise line circuits or trunk circuits, are continuously scanned by a microprocessor in the associated port cell to monitor the line conditions and detect therefrom supervisory requests for control. The microprocessor in each port cell 1a–1n performs all of the real time processing of data in connection with the ports 5 associated therewith; whereas, the central processor unit 18 administers common control functions, regulates all features, and performs all necessary translations of the call data.

The voice signals received from the respective ports are converted to PCM in the port cells 1a–1n and are applied on respective multiplex highways 9a–9n to the digital switching network 16, which is controlled by the CPU 18 to interconnect selected ports by conventional time slot interchange in accordance with subscriber dialing signals and time slots assigned by the CPU 18.

The system of FIG. 1A also includes a miscellaneous cell 15 associated with the digital switching network 16 on a highway 17 for the purposes of connecting one or more operator complexes 8 to selected ports 5 via the associated port cells 1a–1n to provide for communication between the operator and the system stations. The operator complexes 8 are also associated with the central processing unit 18 via a peripheral bus 21 to communicate operator key signals to the central processing unit 18 and to supply from the central processing unit 18 various control signals necessary to the appropriate control over lamps and character displays at the operator console.

Figure 1B:
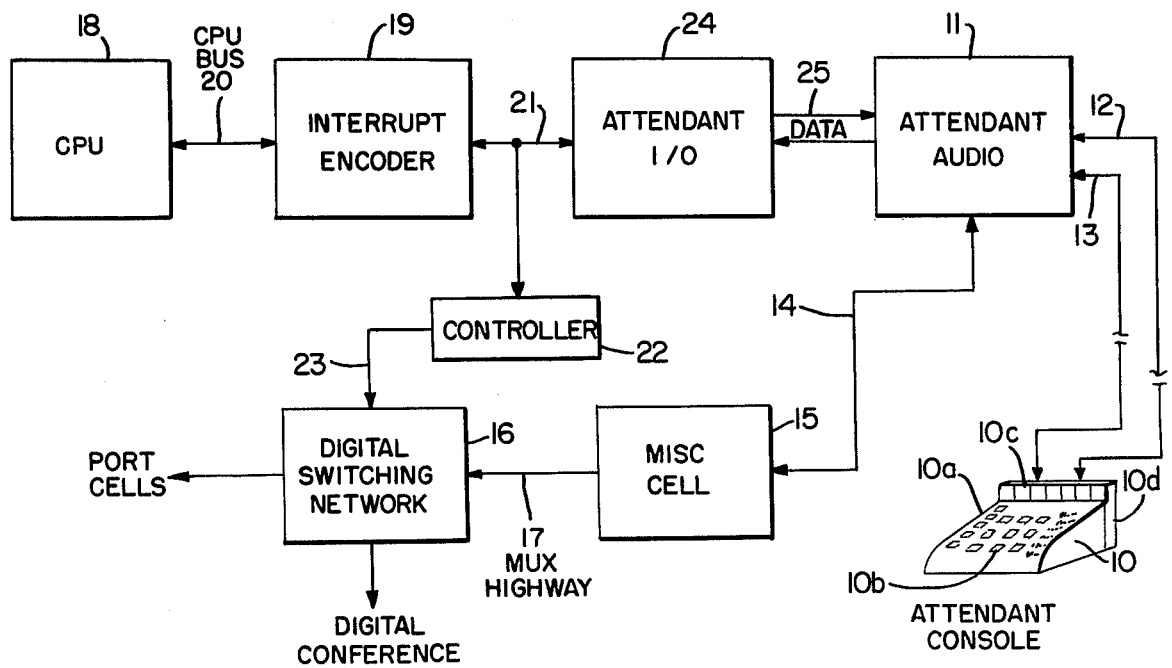
FIG. 1B is a schematic block diagram of the operator complex of the present invention with associated PABX common control circuits.

The basic elements of the operator complex 8 are illustrated in FIG. 1B in conjunction with various common control elements. The attendant console 10 has a keyboard arrangement of control keys 10a with associated display lamps, as well as the standard 12 button keypad 10b. In addition, an alphanumeric display 10c is provided at each attendant console 10 to provide a visual display of data to the operator. A plurality of direct service keys 10d may also be provided; or station selection may be provided through the keypad 10b if desired.

In order to supply key status information to the PABX, the console 10 includes a send control system which continuously scans the control key and keys of the operator keypad to detect transitions indicating operation or release of a key, and based on this information, formulates messages consisting of key identification, transition information, parity, and a synchronizing character for transmission to the central processing unit 18. The console 10 also includes a receive control system which receives from the central processing unit 18 messages consisting of a keylamp identification and flash code, or an alphanumeric display identification and display code, preceded by a synchronizing character, and generates display control signals based upon this information.

In order to eliminate the extensive cabling normally required to carry key status information from the console to the PABX and display control signals from the PABX to the console, and to facilitate remote console operation, the send control system includes a key data multiplexer and the receive control system includes an illuminator data de-multiplexer to enable the multiplexing of this data on a four-wire highway 12 between the attendant console and the PABX. In addition, a modem is provided for modulating the digital message from the send control system into the voice-band using standard frequency shift keying (FSK) and for transmitting the converted message on the highway 12 at approximately 600 BAUD. In the same manner, the modem serves to decode the FSK data representing key lamp and alphanumeric display messages received from the PABX system into digital messages for decoding by the receive control system. The audio is handled in the attendant console 10 in the conventional manner and is transmitted on a two-wire highway 13 from the console 10 to the attendant audio circuit 11.

The attendant audio circuit 11 performs two basic functions. First of all, it serves to convert the control data received on the four-wire highway 12 into the voice-band using standard frequency shift keying (FSK) and to convert FSK data received from the attendant console 10 to digital form. For this purpose, the attendant audio circuit 11 includes a modem similar to that provided in the attendant console 10. The second function of the attendant audio circuit 11 is convert the audio between two and four-wire transmission lines, audio being received from the attendant console 10 on the two-wire highway 13 and being transmitted to the miscellaneous cell 15 on four-wire highway 14, and vice versa. The miscellaneous cell 15 multiplexes the audio signals from respective operator complexes onto a multiplex highway 17 extending to the digital switching network 16, which serves to interconnect the operator with a selected port or digital conference under control of the CPU 18.

As indicated in the aforementioned copending U.S. application Ser. No. 885,181 of Klaus Gueldenpfennig, et al., central processing unit 18 communicates with various peripheral units connected to a peripheral bus 21 via an interrupt encoder 19, which is connected to the CPU 18 via CPU bus 20. One of the peripheral units connected to the peripheral bus 21 is a controller 22, which receives the time slot assignments and control signals necessary to control operation of the digital switching network 16 via line 23. Another peripheral unit connected to the bus 21 is the attendant I/O circuit 24, which serves as an interface between the interrupt encoder 19 and the attendant audio 11, generating interrupts and effecting the necessary parallel series conversion of data between the operator complex and the system. A data highway 25 interconnects the attendant I/O circuit 24 and the attendant audio circuit 11 in the operator complex.

Figure 2:
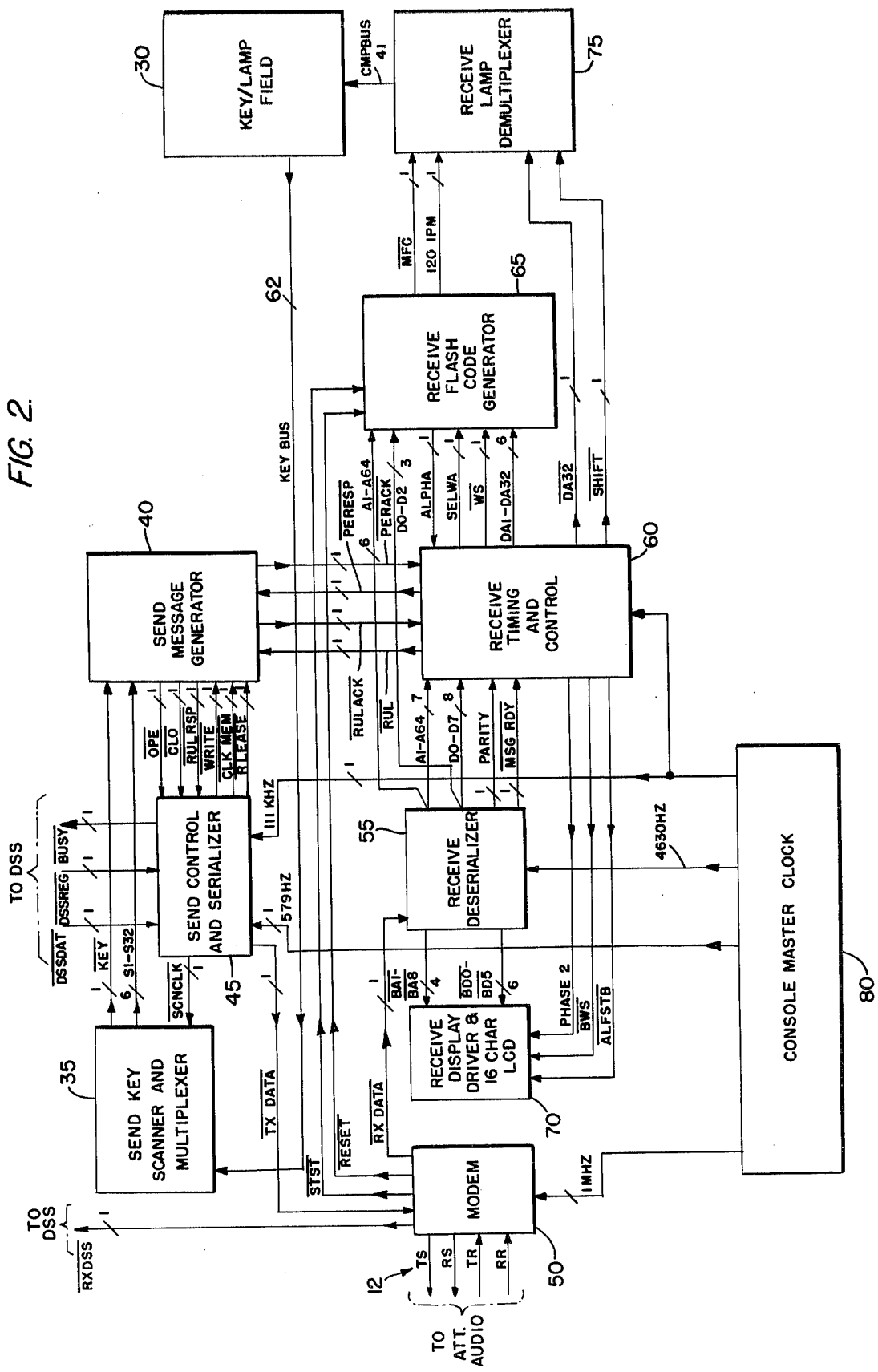
FIG. 2 is a schematic block diagram of the control system of the operator console.
Figure 3:
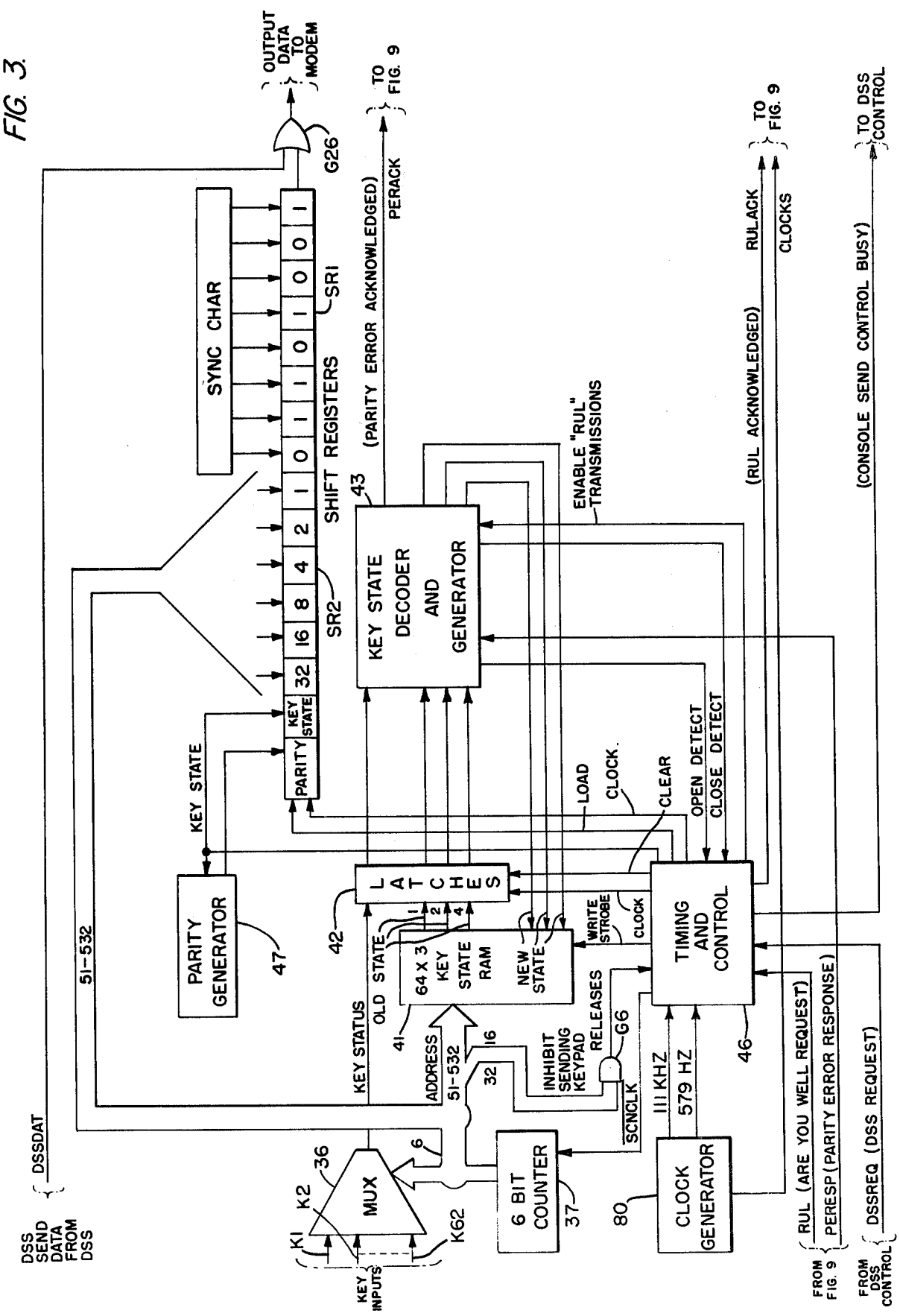
FIG. 3 is a schematic block diagram of the send control system in the control system of the operator console.

FIG. 2 is a basic block diagram of the attendant console data control including both the send control system and receive control system and illustrating the various control lines which extend between the respective circuits. In some cases, these control lines consist of plural wires or paths; therefore, the number of wires or paths in each line is designated by a slash mark through the line and a number adjacent thereto.

The key/lamp field 30 includes a plurality of control keys and keypad keys, which may total 62 keys, for example, along with a plurality of key display lamps for visually indicating the operating condition associated with the control key or the line designated thereby. Each of the keys in the field 30 is connected via a KEY BUS to the send key scanner and multiplexer 35, which provides for repetative scanning of all keys to detect on/off key transitions. The circuit 35 includes a binary counter driven by the scan clock pulses $\overline{\text{SCNCLK}}$ provided by the send control and serializer 45. Thus, for each key being scanned, the circuit 35 provides the key address S1–S32 and the key transition data $\overline{\text{KEY}}$ to the send message generator 40.

The send message generator 40 receives and stores the key transition data with receipt of the clock memory signal $\overline{\text{CLKMEM}}$, compares it with the previous status of that key as stored in memory, and determines whether a valid change in key state is to be recognized on the basis of four consecutive similar transitions. Thus, if the previous key status indicates that the key was "off", four consecutive "on" key transitions will be required to recognize a valid change in the state of the key. When a change in state is recognized, either an open signal $\overline{\text{OPE}}$ or a closed signal $\overline{\text{CLO}}$, as the case may be, will be forwarded to the send control and serializer 45, which will return a timing signal $\overline{\text{WRITE}}$ to the message generator 40 to effect storage of the new status of that key. The stored key state received from circuit 35 is then erased with receipt of $\overline{\text{RLEASE}}$ from circuit 45.

The send control and serializer 45 serves to format a message consisting of a key identification, a transition bit indicating the change in status of the key, a parity bit, and a synchronizing character. This message is then forwarded on line $\overline{\text{TXDATA}}$ to the modem 50 which modulates the digital message into the voice frequency band using standard frequency shift keying and it transmits it to the attendant audio circuit 11 on the data highway 12 via leads TS and RS.

The control data for controlling operation of the key lamp display and alphanumeric displays is received on highway 12 from the attendant audio circuit 11 via leads TR and RR at the modem 50 in FSK data form and the modem 50 demodulates it to digital form. The digital data is then forwarded from the modem 50 on lead $\overline{\text{RXDATA}}$ to the receive deserializer 55 and on lead $\overline{\text{RXDSS}}$ to the direct station selection and busy station number display circuits.

In effect, the highway 12 between the attendant console and the attendant audio circuit is shared with the direct station selection circuit (not shown) in that messages to and from the DSS circuit pass through the modem 50 and the send control and serializer 45, which are shared with the DSS circuit and the key lamp field 30. The manner in which messages are formated indicates whether the message relates to a control key or a DSS key.

If the message is directed to control key lamps or the alphanumeric display, the receive deserializer 55 will decode the message consisting of the key lamp identification (address) and lamp flash code, or an alphanumeric display identification (address) and character code, preceded by a sync character. Upon detection of the synchronizing character in the message, a message ready signal on lead $\overline{\text{MSGRDY}}$ is forwarded to the receive timing and control circuit 60 along with the parity bit on lead PARITY, the data bits on leads D0–D7 and the address bits on leads A1–A64.

The receive timing and control circuit 60 first determines whether the message has proper parity. If incorrect parity is detected, the circuit 60 will generate a signal on lead PERESP to the send message generator 40 to initiate the formulation of a message to the central processing unit 18 indicating that the message was not correctly received and should be repeated. The generator 40 also returns a parity acknowledge signal $\overline{\text{PERACK}}$. If proper parity is detected, address signals A1–A64 and the data signals D0–D2 forwarded from the receive deserializer 55 will be accepted by the receive flash code generator 65. The receive timing and control circuit 60 will also generate a signal on line $\overline{\text{WS}}$ to permit writing of the data D0–D2 into a memory at the proper address location, as indicated by the address bits A1–A64 in the receive flash code generator 65. However, if the message relates to the alphanumeric display, the receive flash code generator 65 will generate a signal on line ALPHA to the receive timing and control 60 to inhibit acceptance of this address and data information, which is to be provided for operation of the receive display driver 70, as will be described hereinafter.

The receive flash code generator 65 is addressed by two sets of addresses in an alternate manner under control of the signal applied from the receive timing and control circuit 60 on lead SELWA. On the one hand, the memory in the generator 65 is continuously scanned from a binary counter to read out the flash codes associated with each of the keys as stored thereby to a flash code selector, which selectively gates out to the output line $\overline{\text{MFC}}$ a signal of selected frequency based upon the flash code. On the other hand, in between each general scanning step of the memory, a new flash code may be read into the memory at the selected address included in the message received from the deserializer 55. The signals on leads $\overline{\text{MFC}}$ and 120 IPM from the receive flash code generator 65, are applied to a receive lamp demultiplexer 75 which selectively applies the signal to the appropriate lamp in the field 30.

If the message received in the deserializer 55 is directed to the alphanumeric display 70, the address bits $\overline{\text{BA1–BA8}}$ and the data bits $\overline{\text{BD0–BD5}}$ from the message are forwarded from the deserializer 55 to the receive display driver 70 along with appropriate timing signals on leads PHASE 2, $\overline{\text{BWS}}$, and $\overline{\text{ALFSTB}}$, to suitably drive the alphanumeric display.

If a DSS key is operated, a request will be generated on line $\overline{\text{DSSREQ}}$ to the send control and serializer 45 requesting use of that circuit. If the circuit 45 is busy it will so indicate on line $\overline{\text{BUSY}}$, but if available, the circuit 45 will receive the DSS key transition message on line $\overline{\text{DSSDAT}}$ and pass the message to the PABX system.

The send control system portion of the console comprises the send key scanner and multiplexer 35, the send message generator 40, and the send control and serializer 45. The receive control system portion of the console comprises receive deserializer 55, receive timing and control circuit 60, and receive flash code generator 65. Each of the circuits in the console is controlled by clock signals derived from the console master clock 80.

The send control system will now be described in greater detail in connection with FIGS. 3–8. The multiplexer 36 sequentially scans the key inputs K1–K62 in response to the addresses generated by the counter 37, which is driven by the scan clock signals $\overline{\text{SCNCLK}}$ provided from the timing and control circuit 46. The key state signals are forwarded from the multiplexer 36 to a set of latches 42, which also receive a three bit binary signal representing the old state of the key, as derived from key state RAM 41 in response to receipt of the address generated by the counter 37. The latches 42 thus store the present key state and the old status of the key being scanned by the multiplexer 36. This data is clocked into the latches 42 by a clock signal derived from the timing and control circuit 46.

A key state decoder and generator 43 then analyzes the data stored in the latches 42 to determine whether a valid key transition (on to off or off to on) is to be recognized. In this regard, the old status of the key includes a count of an on or off transition detected up to four consecutive transitions so that the key state decoder and generator 43 will recognize a valid key transition or change of status only after four such transitions are detected consecutively. In other words, if a key has been "off" and the system suddenly detects an "on" key condition, the system will not recognize this as a valid transition of that key from "off" to "on" until the "on" condition has been detected for four consecutive scans of the key. This is to avoid the recognition of a transition in connection with an invalid key indication, such as may be caused by contact bounce. From the key state information supplied to the multiplexer 36 and the old status of the key supplied from the key state RAM 41, the key state decoder and generator 43 will generate signals representing the new status of the key, which are forwarded to the key state RAM 41 and stored therein upon receipt of the write strobe signal from the timing and control circuit 46.

Details of the key state RAM 41, latches 42, and key state decoder generator 43 can be seen from FIG. 4, which will be described in conjunction with the key state table illustrated in FIG. 6 and the timing diagram of FIG. 7. The address of the key being scanned is derived on leads S1-S32 from the counter 37 and is applied to the key state RAM 41, which reads out the three bits representing the old state of the key from the address storage location in the RAM. These three bits are applied to inputs D1, D2, and D3 of the latches 42, which receive at input D0 the key state of the addressed key on lead $\overline{\text{KEY}}$. The four bits of data are clocked into the latches 42 in response to the clock signal received on lead $\overline{\text{CLKMEM}}$ from the timing and control circuit 46, in FIG. 5.

The data stored in the latches 42 is available on outputs Q0-Q3 to the key state decoder 43, which receives these bits at inputs D1-D4. This decoder 43 in conjunction with its output gates G1, G2, and G3 determine the new status of the key on the basis of the old status and the key state information obtained from the present scan of the key. The sixteen possible combinations of key status are illustrated in the Table in FIG. 6, which shows the old key status, the present key state, and the new key status, respectively. Depending upon the key status received from the multiplexer 36, one of the sixteen key memory states will be determined by the decoder 43. In FIG. 6, an open or non-operated key is represented by a "0" and a closed or operated key is represented by a "1". In sequence number 0, the key is idle open and so both the old key status and the new key status will be 000. When the first closed key transition is detected, the key state decoder 43 will move the key status to sequence number 1 so that the outputs of gates G1, G2 and G3, representing the new key status, will be 001, since the old key status was 000 and the present key status is 1.

The next time the key is scanned, if the present key state indicates that the key is now open, the decoder 43 will move to sequence number 2 with the new key status at the output of the decoder gates G1-G3 being 000. Thus, if the next scan of the key indicates that the key is open, the decoder 43 will move back to sequence 0. On the other hand, after sequence number 1, if the next key scan indicates that the key again is closed, the decoder 43 will move from sequence number 1 to sequence number 3 in which the new status is 010, indicating that two closed key transitions have been detected. If the next scan again indicates a closed condition, the decoder will move to sequence number 5 with a new key status of 011, and if the closed key condition persists, the decoder will then move to sequence number 7 with a new key status of 100. Once sequence number 7 has been reached, the system may recognize a valid key transition from open to closed, since four consecutive closed key transitions have been detected. The system will therefore send a closure indication to the CPU.

It will be noted that in between each of the sequences 1, 3, 5, and 7, a sequence is provided for the case where an open key indication may be received subsequent to a closed key indication. If an open key condition is detected after a closed key condition, the decoder 43 will revert back to sequence number 0. For example, if the key status is in sequence number 1 and an open condition is received, the status will move to sequence number 0. If the next key state is a closed key condition, the status will move back to sequence number 1. If another open key condition is then received, the status will again move back to sequence number 0. This ensures that only after four consecutive similar transitions will a valid transition be recognized.

Sequence number 9 in the key status represents an idle closed condition which will remain unchanged until an open key transition is detected. The sequence from idle closed to idle open is effected in the same manner already described in connection with the detection of idle closed, with four consecutive open transitions being required before a valid recognition of the transition will be made by the system.

Figure 7:
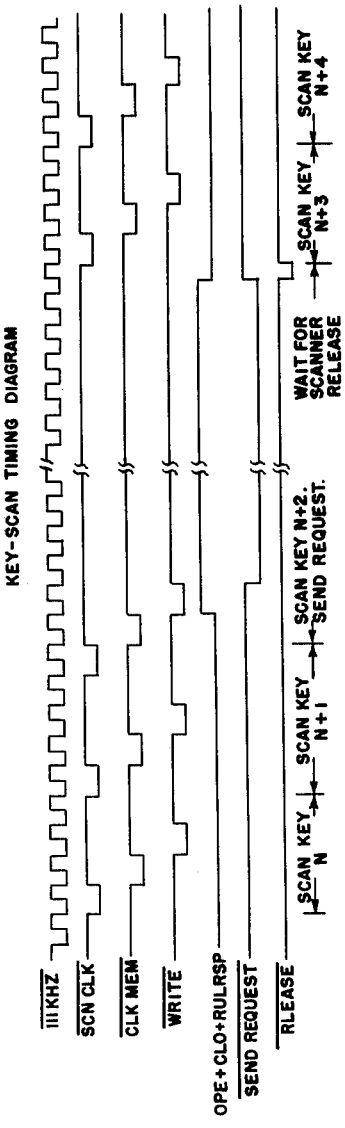
FIGS. 7 and 8 are waveform diagrams of various signals appearing in the circuits of FIGS. 3 through 5.
Figure 8:
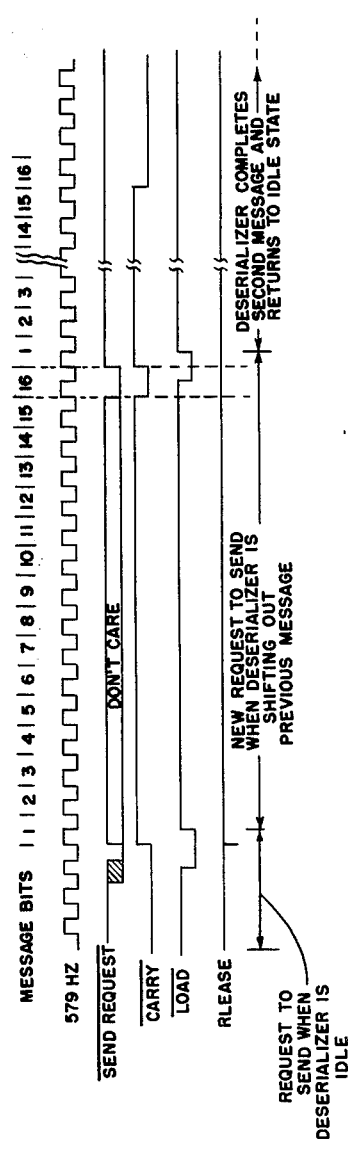

When the key state decoder 43 has completed its analysis of the four bits of key status information, the outputs of gates G1-G3 are applied to the key state RAM 41 at input DI1, DI2, and DI3, and the data is stored in the ram 41 on receipt of the appropriate level on lead $\overline{\text{WRITE}}$, as indicated in FIG. 7. Also, when a valid idle closed condition has been detected at sequence number 7, as seen in FIG. 6, key state decoder 43 provides an output to gate G12, which is applied through gate G13 onto lead $\overline{\text{CLO}}$ indicating the closed gate condition to the timing and control circuit 46 in FIG. 5. Similarly, when the key state decoder 43 reaches sequence number 14, recognizing a valid open key condition, the decoder 43 provides an output through gate G6 onto lead $\overline{\text{OPE}}$ indicating the open condition to the timing and control circuit 46 in FIG. 5.

Looking once again to FIG. 3, if a valid open or closed key transition is detected, the send control system will generate a message conveying the new key status information to the central processing unit. This message consists of two bytes of eight bits each, the first byte consisting of an eight bit sync character and the second byte including a six bit address, one bit representing the new key state and a parity bit. The message is formulated in a shift register SR1, which receives the eight bit sync character, and shift register SR2, which receives the six bit key address from the counter 37, the key state from the timing and control circuit 46, and the appropriate parity bit from the parity generator 47. When the message has been completely formulated, it is shifted out through gate G26 to the modem 50, as seen in FIG. 2, for transmission to the attendant audio circuit 11.

While both open and closed key transitions must be detected in connection with the various control keys in the operator console, it is clear that those keys included in the operator key pad do not require detection of an open or released transition. In other words, release of the keys in the keypad has no general meaning within the system and therefore need not be recognized. Thus, to inhibit the sending of transition data in connection with keypad releases, the gate G6 in FIG. 4 is inhibited from the output of gate G5 for those addresses of the keys of the operator keypad received through gate G4. Thus, while an open transition may be detected by the key state decoder 43, the gate G6 will be inhibited preventing enabling of the lead $\overline{OPE}$ for the keys of the operator keypad.

Figure 4:
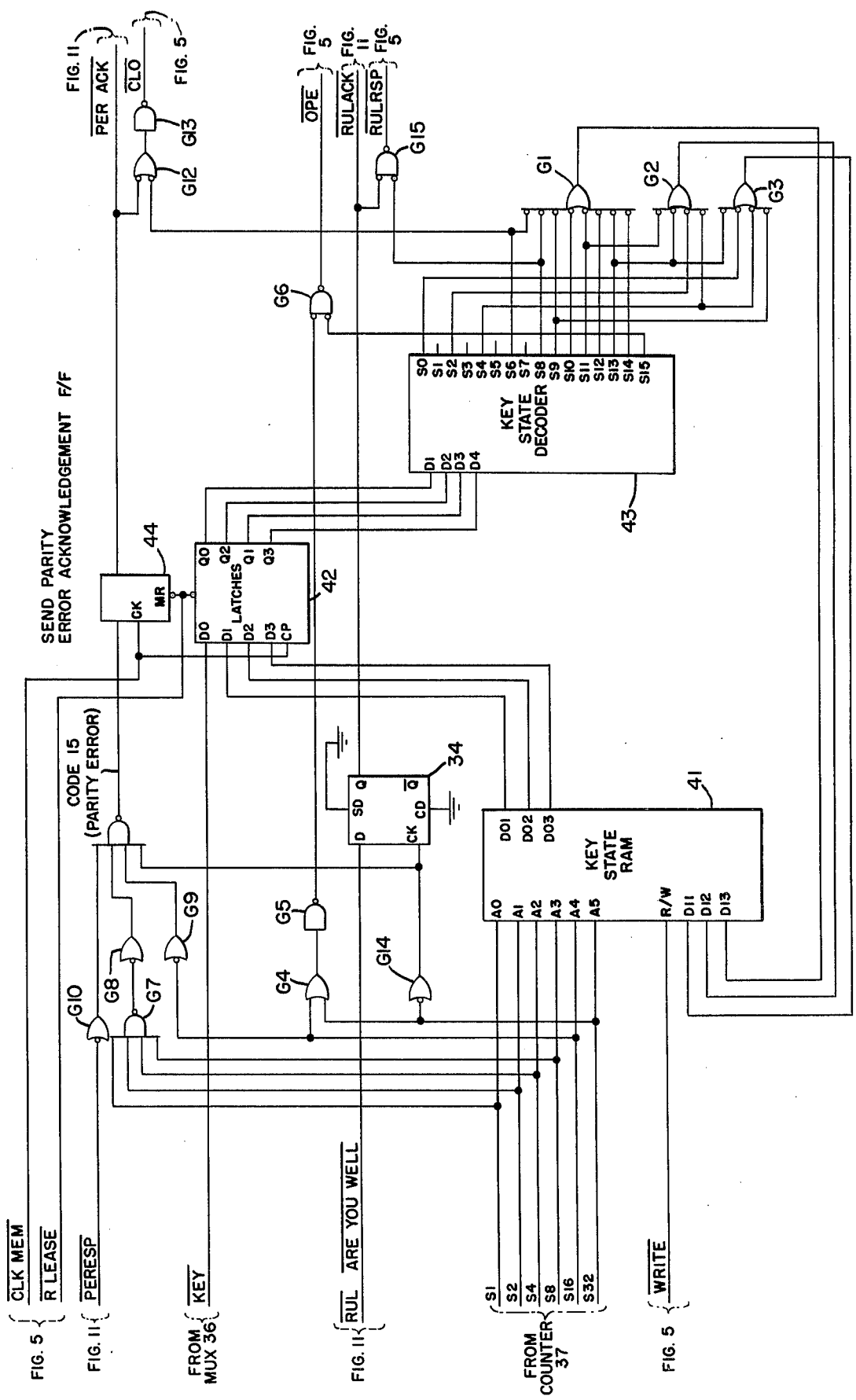
FIGS. 4 and 5 are schematic circuit diagrams of the send control system.
Figure 5:
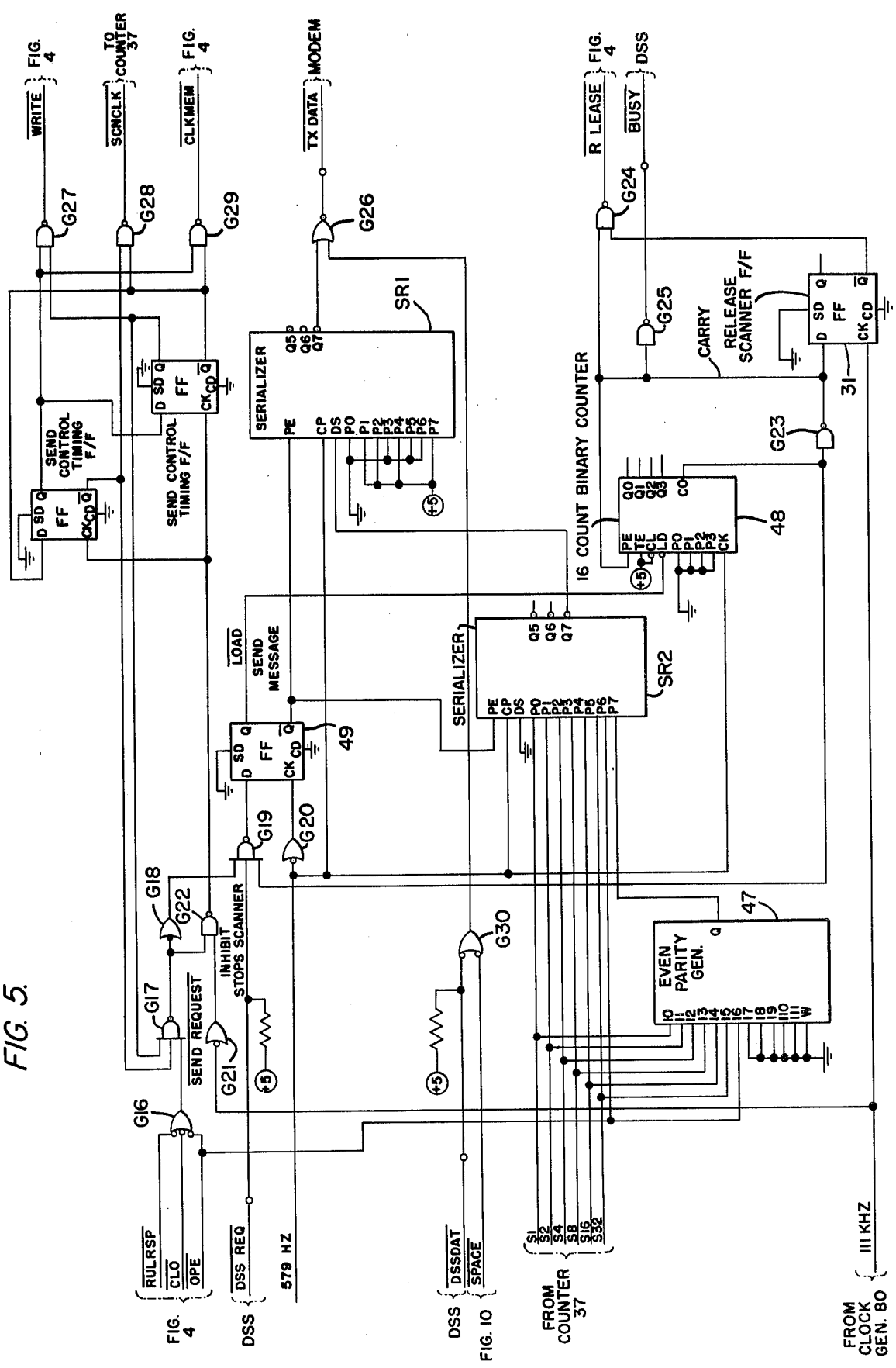

The details of the timing and control circuit 46, parity generator 47, and shift registers SR1, SR2 are illustrated in FIG. 5. A 111 KHZ signal from the clock generator 80 is applied through gates G21 and G22 to the send control timing flip-flops 32 and 33, which provide at the outputs of gates G27, G28, and G29 the respective timing signals $\overline{WRITE}$, $\overline{SCNCLK}$, and $\overline{CLKMEM}$. The signal $\overline{SCNCLK}$ drives the counter 37 and the other signals are applied to FIG. 4 in control of the latches 42 and the key state RAM 41, as already described. When a valid key transition is detected and one of the leads $\overline{CLO}$ or $\overline{OPE}$ is enabled through gate G16, a send request signal will be generated at the output of gate G17 at the end of the $\overline{WRITE}$ pulse, as seen in FIG. 7, which signal will inhibit the gate G22 to prevent further clock pulses from being applied to the flip-flops 32 and 33. Thus, no output will be provided on lead $\overline{SCNCLK}$, thereby stopping the counter 37 which scans the key inputs to the multiplexer 36. This is done to permit the previous message, if any, to be shifted out of the shift registers SR1 and SR2 before the new message is supplied thereto.

The shifting of data from the registers SR1 and SR2 through gate G26 onto lead $\overline{TXDATA}$ to the modem is controlled by a binary counter 48, which is in turn controlled by a send message flip-flip 49 driven from the clock generator 80 by gate G20. When all the data has been shifted out of the shift registers SR1 and SR2, a signal will be provided from the CO output of binary counter 48 to one input of AND gate G19. The send request signal at the output of gate G17 is supplied through gate G18 to a second input of AND gate G19, which will be enabled if no DSS request is received at that time on lead $\overline{DSSREQ}$. Enabling of AND gate G19 will set the send message flip-flop 49 causing $\overline{LOAD}$ to go low, and the address from counter 37 will be shifted in parallel into the shift register SR2 along with the parity bit from parity generator 47 and the key state derived from the key state decoder 43. The synchronizing character is automatically loaded into the shift register SR1. At this time, the CO output of the counter 48 is also applied through gate G23 to enalbe gate G24 to generate an output on lead $\overline{RLEASE}$ to the latches 42 in FIG. 4, thereby resetting the latches, and gate G25 is enabled to inform the DSS circuit on lead $\overline{BUSY}$ of the busy condition. With this, any outputs on leads $\overline{OPE}$ or $\overline{CLO}$ to gate G16 in FIG. 5 disappear, causing the send request signal at the output of gate G17 to disappear and thereby opening up the gate G22 to permit the scanner to drive the flip-flops 32 and 33 once again. Thus, scanning of the keys by the multiplexer 36 resumes.

At the next clock signal applied through gate G20, the send message flip-flop 49 is reset causing the $\overline{LOAD}$ signal to go high. This results in the message being shifted out of the registers SR1 and SR2 serially through gate G26 to the modem on lead $\overline{TXDATA}$ as the binary counter 48 is reset and cycles with the applied clock pulses. Also, the release scanner flip-flop 31 sets causing $\overline{RLEASE}$ to go high. When the counter 48 reaches its maximum count, all data has been shifted out of registers SR1 and SR2, and the next message can be formulated.

If a DSS request comes in to gate G19, flip-flop 49 is inhibited, the $\overline{BUSY}$ lead is not enabled, and data from the DSS circuit may be applied through gates G30 and G26 to lead $\overline{TXDATA}$.

The receive control system will now be described in more detail in conjunction with FIGS. 9–14. The message received from the CPU 18 consists of three bytes of eight bits each. The first byte is a standard eight bit synchronizing character which is used to indicate that the message is a proper message and that it has been completely received. The second byte consists of a parity bit and seven data bits indicating the illuminator or alphanumeric display address. The third byte includes a three bit flash code if the second byte identifies illuminator codes, a six bit alphanumeric character code if the second byte designates an alphanumeric display, or an eight bit DSS illuminator identity if the second byte indicates that the message relates to DSS (direct station selection) service.

Figure 9:
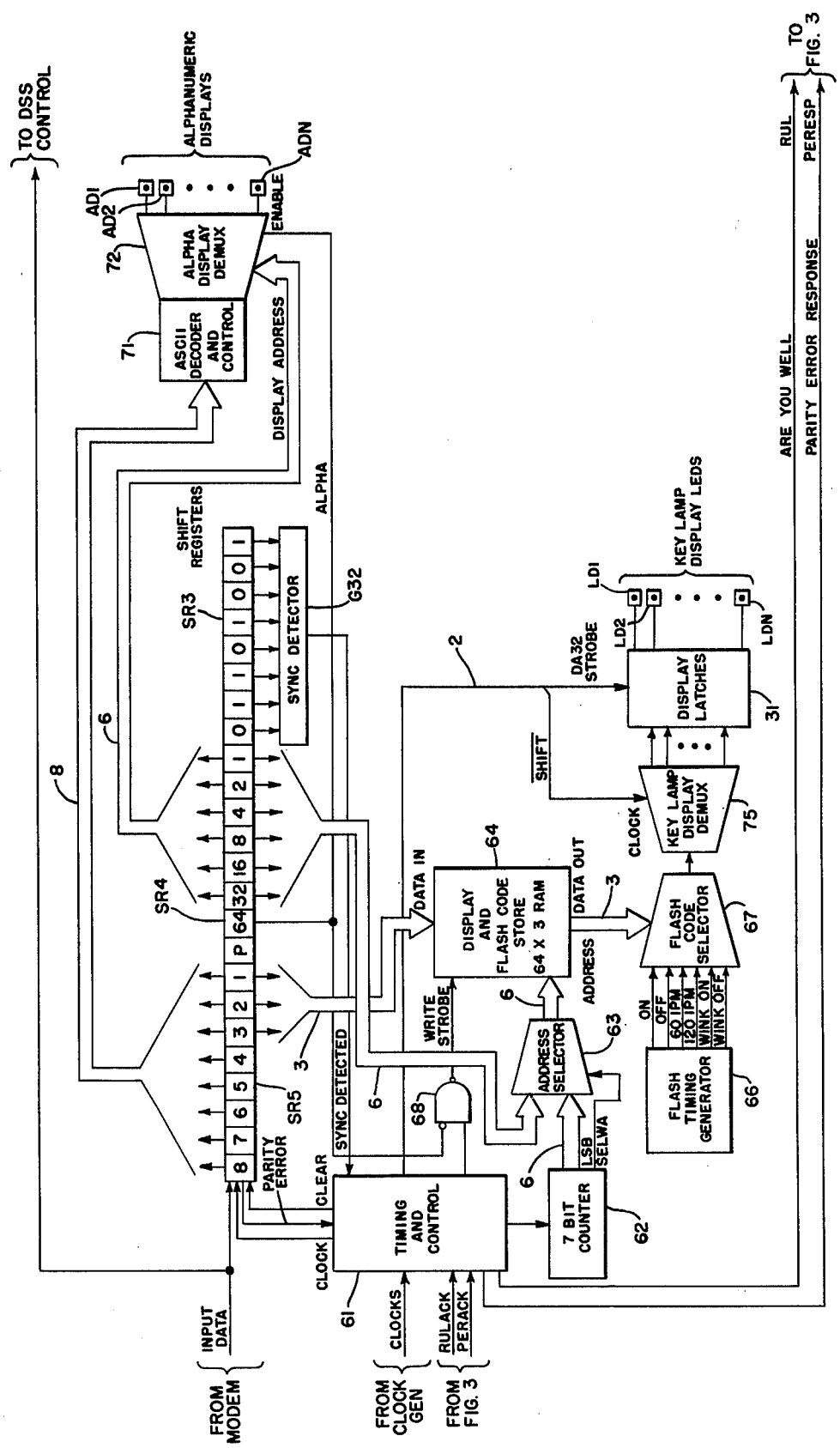
FIG. 9 is a schematic block diagram of the receive control system in the control system of the operator console.

As seen in FIG. 9, the three bytes of the message are received serially from the modem in the three shift registers SR3, SR4, and SR5. When the sync detector G32 detects the synchronizing character in the shift register SR3, it signals the timing and control circuit 61 that a complete message has been received and is ready for decoding. As indicated, the second byte of the message will indicate whether the message relates to illuminator control, alphanumeric display control, or the DSS service. Thus, the timing and control circuit 61 will first determine whether the second and third bytes of the message have the proper parity and then decode the second byte of the message to determine what type of message has been received.

Figure 10:
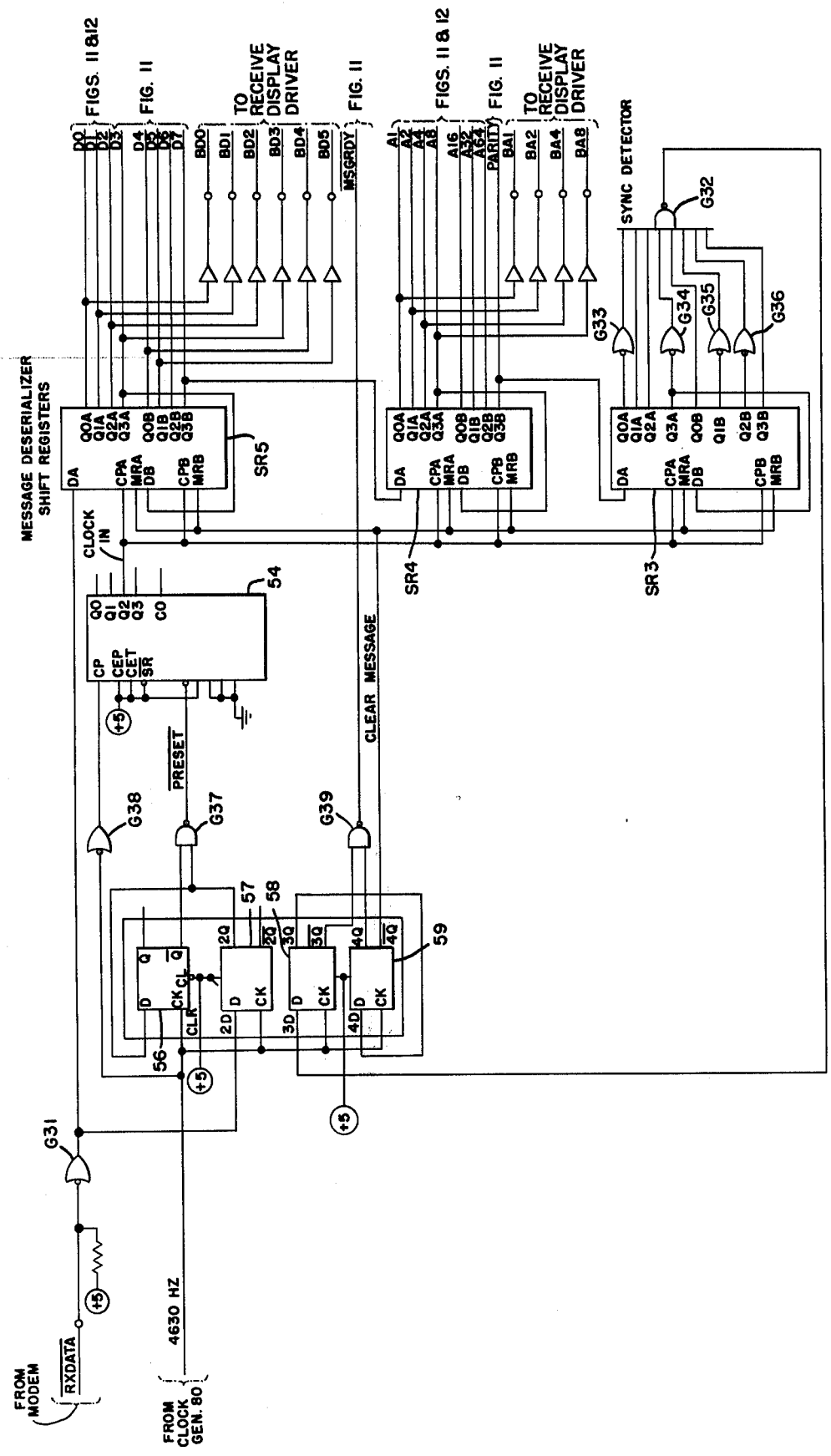
FIGS. 10, 11 and 12 are schematic circuit diagrams of the receive control system.

The details of the shift registers SR3, SR4, and SR5, and the control circuitry for shifting data into these registers, is illustrated in FIG. 10. The timing diagram in FIG. 13 also indicates the timing of the receipt of the serial data from the modem 50 and how the clock within the receive control system is aligned with the receipt of the incoming data.

The serial data is received on lead $\overline{RXDATA}$ and applied through gate G31 on the one hand to the data input of the shift register SR5, which is connected in series with the shift registers SR4 and SR3. The serial data at the output of gate G31 is also applied to an edge detector comprising flip-flops 56 and 57. The flip-flop 57 detects the leading edge of the incoming data to enable gate G37, which generates the signal $\overline{PRSET}$ to preset the counter 54. On the next clock pulse, the flip-flop 56 is set disabling the gate G37. The clock pulses from the master clock 80 are also applied through gate G38 to drive the counter 54, which counts down from the preset count and in due course provides an output CLOCK IN to enable each of the shift registers SR3, SR4, and SR5 to shift data.

Figure 13:
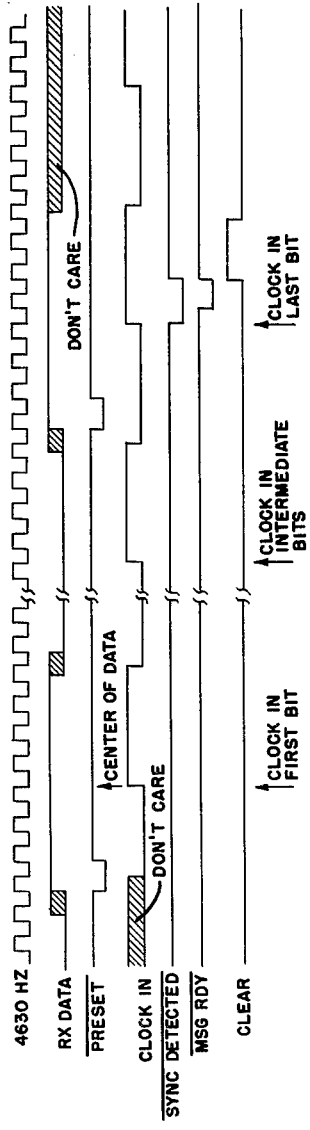

As seen in FIG. 13, the signal CLOCK IN is generated at the center of the received data to insure that the data is available for shifting into the shift registers SR3–SR5. Thus, the edge detector formed by flip-flops 56 and 57 and the counter 54 serve to align the clock for the shift registers SR3, SR4, and SR5 with the center of the received data. In this way, the clock which controls the shift registers aligns itself with the receipt of each bit of serial data from the modem 50.

When the entire message has been received, the synchronizing character in the shift register SR3 will be detected by the sync detector consisting of gate G32 and inverting gates G33–G36. The output of gate G32 is applied to flip-flop 58 which enables gate G39 to generate the message ready signal $\overline{\text{MSGRDY}}$, which is forwarded to the timing and control circuit 61 in FIG. 11. On the next clock pulse, the flip-flop 59 will set disabling the gate G39 and generating a CLEAR MESSAGE signal to clear the data in each of the shift registers SR3, SR4, and SR5.

The seven data bits in the second byte of the message may having the following identities:

0–63 = illuminator identity for 64 lamps
64–79 = alphanumeric display identity
80–118 = spare
119 = RUL request (third byte ignored)
120–127 = reserved for DSS.

Referring to FIG. 9, if the second byte of the message falls within 0–63, the message will relate to an illuminator identity. Thus, the six significant bits are forwarded to an address selector 63 to address a storage location in the display and flash code store 64, which stores selected flash codes for each of the key lamps in the console. The particular flash code to be stored at that address in the store 64 is designated by the first three bits of the third byte of the message, which are applied to the store 64 from the shift register SR5 and stored therein upon receipt of the write strobe signal applied from the timing and control circuit 61 through gate G68.

The address selector 63 is a multiplexer which alternately applies to the display and flash code store 64 the address from the received message and a scanning address received from a seven bit counter 62. The address from the message is applied to the store 64 from the address selector 63 to designate the storage location into which the data is to be written from the message; while, the address applied from the counter 62 through the address selector 63 to the display and flash code store 64 designates the address from which data is to read out to a flash code selector 67. Thus, the storing of flash codes in the store 64 is effected in an interdigitated manner with the scanning of the store 64 to read out the stored flash codes to the flash code selector 67.

Figure 11:
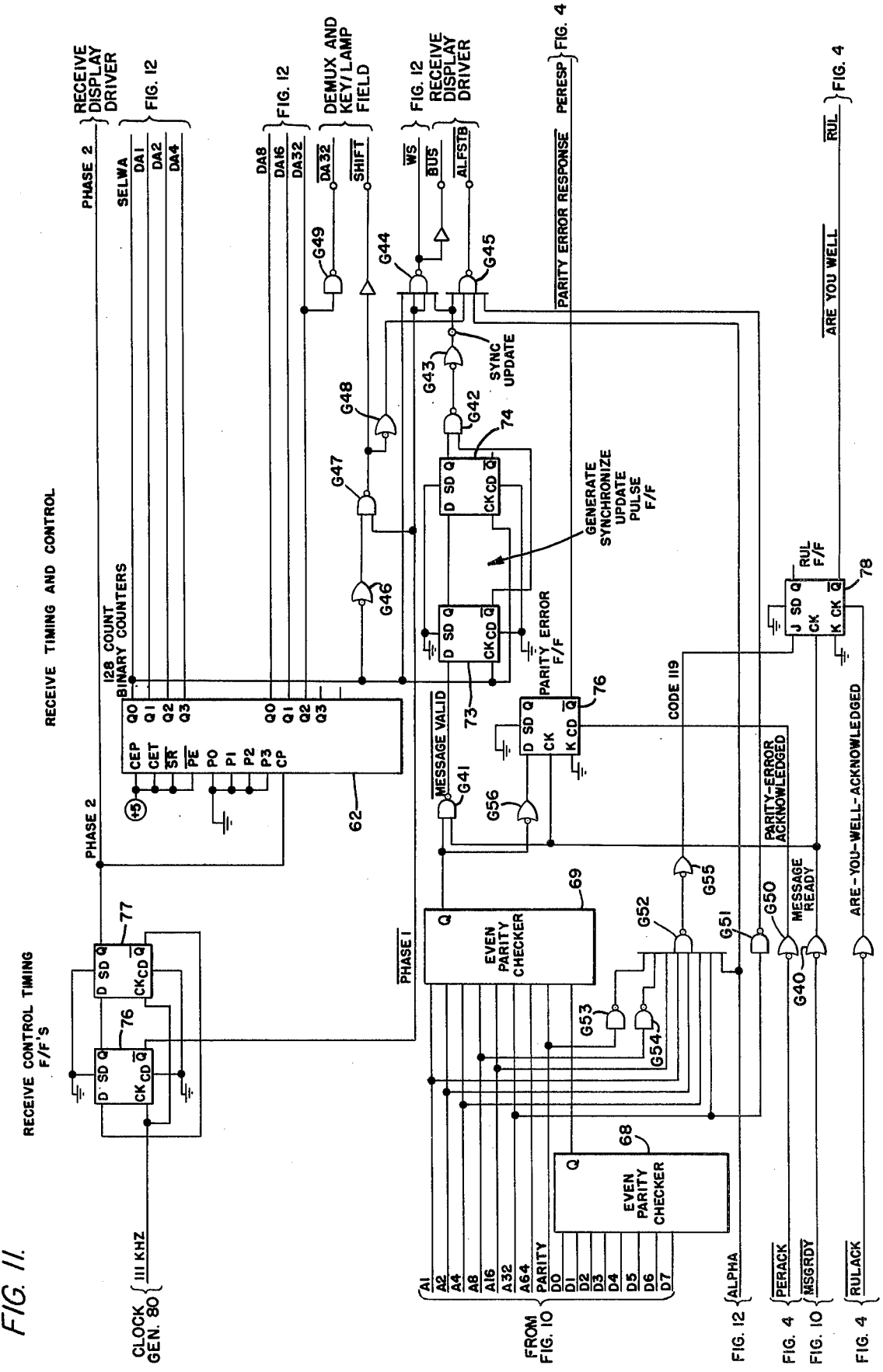

The details of the timing and control circuit 61 are illustrated in FIG. 11, and the timing diagram of FIG. 14 indicates the various signals involved in the operation of this circuit. When the message ready signal $\overline{\text{MSGRDY}}$ is generated at the output of gate G39 in FIG. 10, this signal is applied through gate G40 to one input of AND gate G41 in FIG. 11. The eight bits of the second byte and the eight bits of the third byte of the received message are applied from the shift registers SR4 and SR5 to respective parity checking circuits 68 and 69 on leads A1–A64, PARITY, and D0–D7, thereby checking the parity of the two bytes together. If even parity is detected, the checking circuit 69 will provide an output to enable the AND gate G41 providing at the output thereof a $\overline{\text{MESSAGE VALID}}$ signal to a pair of flip-flops 73 and 74 which serve to generate a synchronize update pulse from the output of gate G42 via gate G43.

A pair of flip-flops 76 and 77 are driven from the master clock to provide respective timing signals $\overline{\text{PHASE 1}}$ and PHASE 2, as seen in FIG. 14. The PHASE 2 signal clocks the binary counter 62 which generates the scanning address signals for scanning the storage locations in the display and flash code store 64. The least significant bit of the output of the counter 62 provided on line SELWA is utilized to control the address selector 63 to shift between the address from the received message and the address provided by the counter 62.

Upon generation of the synchronize update pulse at the output of gate G43 after valid parity has been detected and a message valid signal has been generated, gate G44 will be enabled to generate the write strobe signal $\overline{\text{WS}}$ which serves to write the first three bits of the data in register SR5 into the display and flash code store 64. On the other hand, if the received message relates to the aplhanumeric display, the gate G45 will be enabled by enabling of the lead ALPHA along with the synchronize update pulse at the output of gate G43 and the output of enabled gate G51. Gate G45 will generate the alphanumeric strobe signal $\overline{\text{ALFSTB}}$.

If the parity checking circuits 68 and 69 detect odd parity in the received message, the parity error flip-flop 76 will be set from the output of gate G56 to generate a parity error response on lead $\overline{\text{PERESP}}$. This signal is to be formulated into a message by the send control system to inform the CPU 18 that the message has been improperly received and should be resent. Referring to FIG. 4, the signal $\overline{\text{PERESP}}$ is applied through gate G10 to one input of AND gate G11, the other inputs of which are applied from the counter 37 through gate G7, G8, G9, and G14. The logic gate combination serves to enable the AND gate G11 when the address for key 15 has been generated by the counter 37 and a $\overline{\text{PERESP}}$ signal is received from the receive control system. The enabled gate G11 will set the flip-flop 44 to provide an output through gate G12 and gate G13 on lead $\overline{\text{CLO}}$ indicating a closed key condition, which is inserted into the message in the shift register SR2 in FIG. 5. Thus, the CPU 18 will receive a message indicating that a closed key condition is detected in connection with key 15; however, key 15 in this system is a ficticious control key, which is recognized by the CPU 18 as an indication that a parity error has been detected in the console. Based on this information, the CPU 18 then initiates a retransmission of the message. Also, at the time flip-flop 44 is set, a parity acknowledge signal $\overline{\text{PERACK}}$ is forwarded through gate G50 in FIG. 11 to reset the parity error flip-flop 76.

Referring once again to FIG. 9, the flash codes which are sequentially read out of the display and flash code store 64 are applied to a flash code selector 67 which selects one of the flash signals from a flash timing generator 66 on the basis of the received code. The signal is applied from the flash code selector to a key lamp display demultiplexer 75 which is clocked by the signal SHIFT produced from gates G46 and G47 in FIG. 11 with the timing indicated in FIG. 14. These flash signals are applied to the key lamps LD1-LDn through the display latches 31 which are strobed by the timing signal DA32 generated from the binary counter 62 in FIG. 11.

Figure 12:
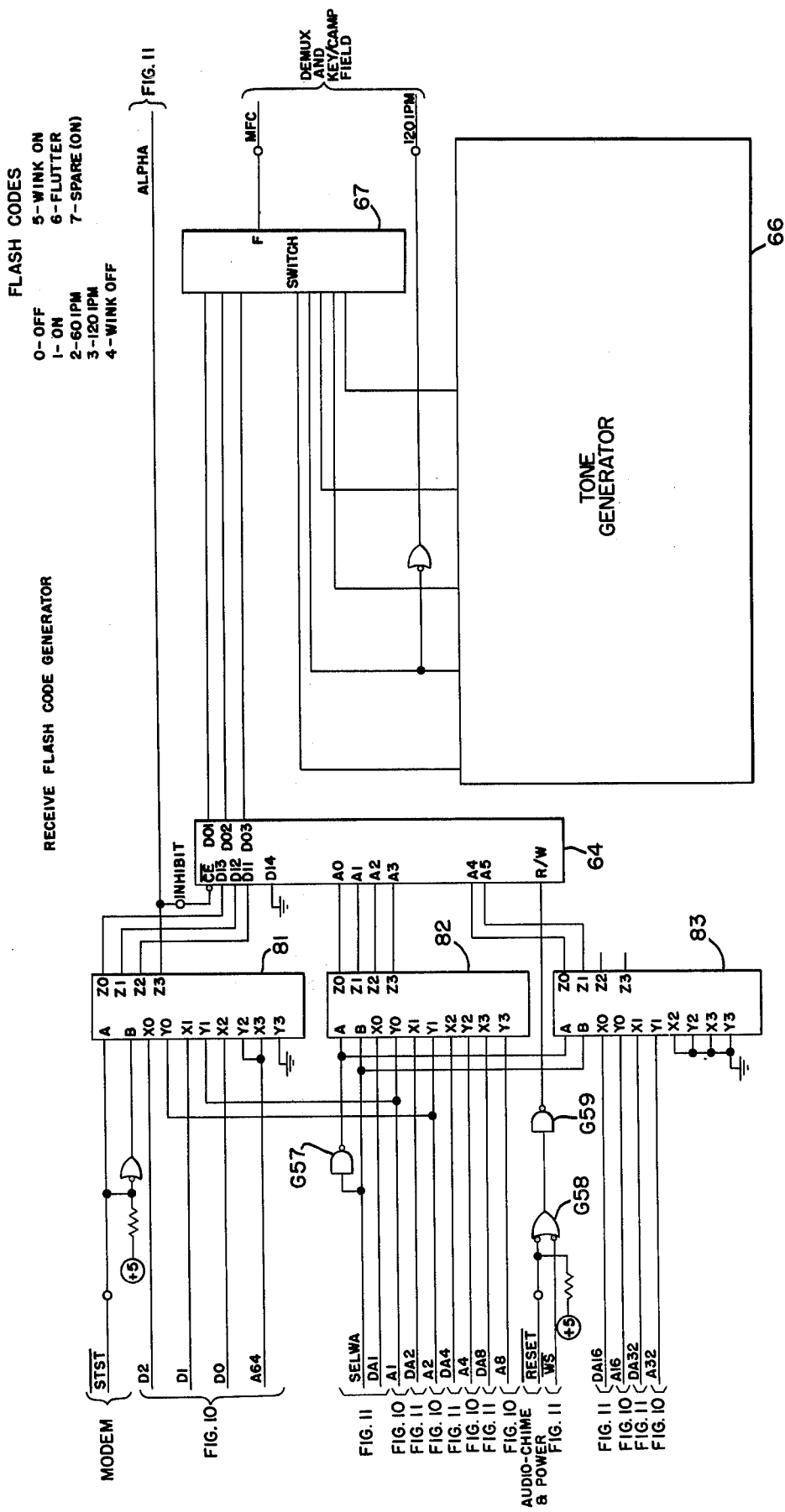

FIG. 12 illustrates the details of the address selector 63, display and flash code store 64, flash timing generator 66, and flash code selector 67. The address selector 63 comprises three multiplexers 81, 82, and 83. The multiplexer 81 is connected to receive the first three bits of the third byte of the message along with the seventh bit A64 of the second byte. The three bits on leads D0-D3 will be applied to the multiplexer 81 along with the bit A64. The six address bits from the second byte of the message are provided on leads A1-A8 to the multiplexer 82 and leads A16 and A32 to the multiplexer 83. The scanning address signals provided from the binary counter 62 are supplied on leads DA1-DA8 to the multiplexer 82 and on leads DA16 and DA32 to the multiplexer 83.

As already indicated, the least significant bit of the output of the counter 62 on lead SELWA controls whether the address signals DA1-DA32 or A1-A32 are stored in the multiplexers 82 and 83. In this way, as seen in FIG. 14, a message address will be gated, then a scanning address will be gated, alternately applying one address and then the next address to the display and flash code store 64, as controlled by the A and B inputs to the respective multiplexers 82 and 83 applied on lead SELWA and through gate G57.

When a message address is received in the multiplexers 82 and 83, the store 64 will be addressed to receive the three bits of data from the third byte of the message supplied to the multiplexer 81 on leads D0-D3 provided the message is related to key lamp display control. As already indicated, if the second byte of the message indicates an illuminator identity of 64-79, it will be determined that the message relates to alphanumeric display identity rather than illuminator identity. This is simply determined by examining the A64 bit to determine whether or not the message is of one type or the other. If the A64 lead is enabled at the input of multiplexer 81, the input $\overline{CE}$ of the store 64 will be enabled to inhibit a reading of the data into the store. This is illustrated in FIG. 9 by the gate G68 being inhibited to prevent the write strobe signal to be applied to the store 64. In effect, the function is accomlished without the provision of a gate, as seen in FIG. 12.

When a scanning address is applied to the store 64, the flash code stored at that location in memory is read out to the flash code selector 67 to which is connected a flash timing generator 68. The flash timing generator 66 produces a plurality of different flash signals which may be selectively gated through the selector 67 on lead MFC to the key lamp display demultiplexer 75.

As seen in FIG. 9, where the message relates to control over the alphanumeric display, the second byte of the message will provide the display address to the alphanumeric display demultiplexer 72 while the third byte of the message will provide the identification of the character which is decoded by the decoder 71. In this way, a selected element AD1-Adn of the addressed alphanumeric display will be selectively energized as required.

A further feature of the present invention relates to the provision of means in the operator console to permit the CPU 18 to determine that the console is properly operating and scan the various key states which are stored in the key state RAM 41 of the second control system. The CPU 18 accomplishes this by sending a message to the console in which the second byte is set at a value 119. Referring to FIG. 11, the gates G52, G53 and G54 detect the code 119 in the third byte of the received message and provide an output through gate G55 to set flip-flip 78 upon a receipt of the message read signal $\overline{MSGRDY}$ via gate G40. The flip-flop 78 generates an "are you well" signal on lead $\overline{RUL}$ which is applied to flip-flop 34 in FIG. 4. The flip-flop 34 is set by the clock signal on lead S32 and remains set for a full cycle of the scanning addresses. The output of flip-flop 34 enables gate G15 to pass a signal from the key state decoder 43 representing the sequence number 9 for each key state being scanned. In this way, as each of the keys is scanned in the multiplexer 36, each key which is in the idle closed condition will cause gate G15 to be enabled generating a signal on lead $\overline{RULRSP}$ to the input of gate G16 in FIG. 5. As already described, the enabling of gate G16 results in generation of a send request at the output of gate G17 so that a closed key condition will be forwarded to the central processing unit 18 even though that indication may have previously been forwarded.

At the same time the flip-flop 34 in FIG. 4 is set, an output is applied on lead $\overline{RULACK}$ to FIG. 11 acknowledging the "are you well" request and resetting the flip-flop 78. In this way, the operator console will supply to the central processing unit during one complete scan of all the keys the present state of these keys so that the system may obtain this information, which may be needed for example after a loss of power in the system in which this information has been lost by the central processing unit 18.

FIG. 15 illustrates the details of the data or control section of the attendant audio circuit 11, the basic function of which is to convert signals received from the attendant console in FSK form to digital form and to convert the digital data received from the attendant R/O circuit into FSK form. This is accomplished by a conventional modem 90.

The FSK signal received from the attendant console undergoes some conditioning before it drives the modem 90. First of all, the signal is filtered by a bandpass filter 85 which may consist of a combination of passive and active bandpass filters. The purpose of this filtering is to increase the signal-to-noise ratio and reduce accordingly the probability of error detection. The output of the filter 85 is applied through amplifier 86 on the one hand to a limiter 87 and on the other hand to a threshold detector 88. The limiter 87 serves to detect zero crossovers and basically provides a squarewave output which is applied to the modem 90 for processing. The threshold detector 88 inhibits the modem 90 when the input carrier signal is below a predetermined level, for example, approximately 55 millivolts. During this condition, the $\overline{CT}$ output of the modem 90 goes high providing an alarm signal to indicate carrier loss to the system.

The data from the attendant I/O circuit is received by a line receiver 92 on leads 81 and 82 and is applied to the modem 90 for conversion to FSK form. The output from the modem 90 is applied through amplifier 93 and transformer TR4 onto leads T2 and R2 to the attendant console.

Figure 16:
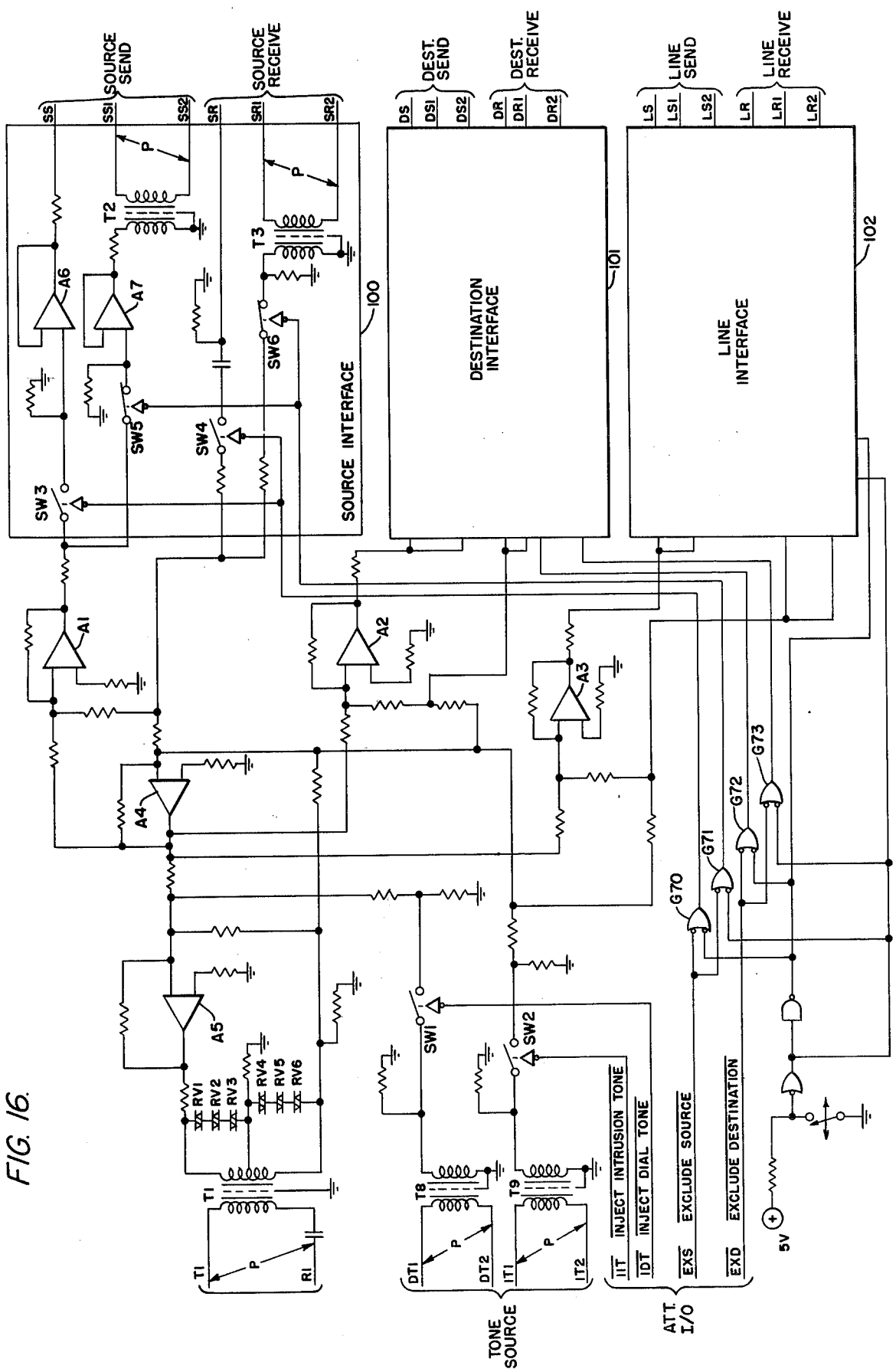
FIG. 16 is a schematic circuit diagram of the audio portion of the attendant audio circuit.

FIG. 16 illustrates the voice section of the attendant audio circuit. Basically, this circuit is a four-way conference active network which combines the audio voice signals of the source, destination, line, and attendant.

The interface of this circuit with the attendant console is via the two-wire path T1 and R1; while, the audio interface with the PCM codec in the miscellaneous cell 15, as seen in FIG. 1B, is via four-wire paths.

The audio signals from the operator via the operator console are provided through transformer TR1 to the source interface 100, destination interface 101, and line interface 102 via the respective amplifiers A1, A2, and A3. The four-wire interfaces 100, 101, and 102 can each be divided into two basic sections. The first section interfaces with the conference circuit matrix in the PABX system; while, the second section comprises those lines which interface with the filters in the main matrix of the PABX system. Thus, as seen in the source interface 100, depending upon the state of switches SW3 and SW5, the output of amplifier A1 will either be applied through amplifier A6 to the line SS, or the output of amplifier A1 will be applied through amplifier A7 and a transformer TR2, to the pair of lines SS1 and SS2. In a similar manner, depending upon the state of switches SW4 and SW6, either the receive audio signal on lead SR will be applied to the input of amplifier A4, or the receive audio signal on the transmission pair SR1 and SR2 will be applied through transformer TR3 via A4.

As seen in FIG. 16, the network is arranged in such a way that side tone is eliminated by reinjecting to each port its own signal in opposition of phase. Thus, the audio signal from the operator is not only applied to the input of amplifier A1, but is also reinserted through amplifiers A4 and A5 back to the operator. The received audio signal in each of the interface circuits 100, 101, and 103 also are not only applied through amplifiers A4 and A5 to the operator, but are also reinjected through amplifiers A1, A2, and A3, respectively.

A capacitor C1 is provided at the attendant two-wire port in line R1 to block any D.C. current through the secondary of the hybrid transformer TR1. This hybrid transformer TR1 is also loaded with a series of varistors RV1-RV6 to provide for secondary lightning protection.

The basic outputs of the network as seen in FIG. 16 can be switched between the conference matrix and the main matrix by means of the analog gates G70-G73, as seen for example in connection with the source interface circuit 100, wherein the gates G70 and G71 control the operation of the switches SW3, SW4, SW5, and SW6. These analog gates are also used to implement the exclude source of exclude destination operations by merely opening those paths as commanded by control signals received from the attendant I/O circuit on leads $\overline{EXS}$ and $\overline{EXD}$, respectively.

Ring-back tone can be selectively injected into the circuit from the tone source on leads DT1 and DT2 through transformer TR8 under control of the switch SW1, which is responsive to the control signal from the attendant R/O on lead $\overline{RBT}$. Similarly, intrusion tone can be injected into the circuit on leads IT1 and IT2 through transformer TR9 depending upon the condition of switch SW2, which is controlled from the attendant I/O on lead $\overline{IIT}$.

While we have shown and described only several embodiments in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

We claim:

1. An operator console for a PABX system having a common control comprising:
   a plurality of actuatable keys each having first and second operative states and means for generating key state signals indicating the operative state of each of said keys;
   means for repetitively scanning the operative state of said keys including multiplexing means for sequentially multiplexing said key state signals;
   storage means for storing the operative state of each key;
   decoder means responsive to the operative state of a key as provided by said storage means and the key state signal generated by that key as provided by said means for scanning, said decoder means being operative to detect a transition of said key from said first to said second operative states for generating a key transition signal in response to said detections; and
   message formulating means responsive to said decoder means and said means for scanning, said message formulating means being operative to formulate a message to be sent to said common control, said message including said key transition signal and the key identification.

2. An operator console as defined in claim 1, wherein said message is transmitted to said common control over a multiplex data link.

3. An operator console as defined in claim 1, wherein said decoder means includes means for generating said key transition signal only after detection of said transition of said key from said first to said second operative states and maintenance of said key in said second operative state for a plurality of successive scans of the operative state of said key.

4. An operator console as defined in claim 3, wherein said decoder means further includes means for updating the operative state of each key on the basis of said key signals for each scan of said keys.

5. An operator console as defined in claim 1, wherein said means for scanning includes counter means for generating sequential key addresses to drive said multiplexing means, said storage means comprising a random access memory addressed by said scanning means.

6. An operator console as defined in claim 5, wherein said decoder means includes means responsive to the output of said multiplexing means and said random access memory for counting the number of consecutive same type operative states of each key detected on the basis of said key state signals and for storing such count in said random access memory.

7. An operator console as defined in claim 6, wherein said decoder means includes means for generating said key transition signal only after detection of said transition of said key from one positive state to the other operative state and maintenance of said key in said other operative state for a predetermined number of successive scans of said key.

8. An operator console as defined in claim 7, wherein said message formulating means comprises at least one shift register connected to receive a key address from said means for scanning and said key transition signal from said decoder means.

9. An operator console as defined in claim 7, further including means responsive to a request from said common control for actuating said message formulating means in conjunction with each key status stored in said random access memory which has resulted in the generation of a key transition signal.

10. An operator console as defined in claim 1, further comprising a plurality of display lamps, flash timing generator means for generating a plurality of lamp energizing signals of different frequency, another decoder means for decoding flash code messages from said common control, and control means responsive to said decoder means for connecting a selected output of said flash timing generator means to a selected display lamp.

11. An operator console as defined in claim 10, wherein said another decoder means includes flash code memory means for storing a designated flash code for each display lamp and another means for scanning operative to sequentially address said memory means to read out each flash code in turn to said control means.

12. An operator console as defined in claim 11, wherein said control means includes flash code selector means for multiplexing the outputs of said flash generator means in accordance with the flash codes sequentially received from said memory means, display demultiplexing means for demultiplexing the output of said selector means and gating means for applying the outputs of said demultiplexing means to the respective display lamps.

13. An operator console as defined in claim 11, wherein said another decoder means further includes address selector means for alternately reading data from said flash code messages into said memory means and scanning the contents of said memory means in reponse to said another means for scanning.

14. An operator console as defined in claim 10, further including means for detecting improper parity in said received flash code message, and means responsive to said another decoder means for enabling said message formulating means to send a fictitious key transition signal indicating improper receipt of said flash code message.

15. An operator console for a PABX system having a common control comprising:
a plurality of display lamps,
a flash timing generator means for generating a plurality of lamp energizing signals of different frequency,
decoder means for decoding flash code messages from said common control, and
control means for connecting a selected output of said flash timing generator means to a selected display lamp,
said decoder means including flash code memory means for storing a designated flash code for each display lamp and scanning means for sequentially addressing said memory means to read out each flash code in turn to said control means,
said decoder means further including at least two registers for receiving first and second bytes of said flash code messages, said first byte designating the address of a selected display lamp and said second byte including the flash code associated with the selected display lamp.

16. An operator console as defined in claim 15, wherein said decoder means further includes address selector means for alternately applying to said flash code memory means the address from said first byte of said flash code message and the output of said scanning means so as to interleave the writing of new flash codes into said memory means and the sequential reading of stored flash codes from said memory means.

17. An operator console as defined in claim 16, wherein said control means includes flash code selector means for multiplexing the outputs of said flash timing generator means in accordance with the flash codes sequentially received from said memory means, display demultiplexing means for demultiplexing the output of said selector means and gating means for applying the outputs of said demultiplexing means to the respective display lamps.

18. An operator console for a PABX system having a common control comprising:
a plurality of display lamps,
a flash timing generator means for generating a plurality of lamp energizing signals of different frequency,
decoder means for decoding flash code messages from said common control, and
control means for connecting a selected output of said flash timing generator means to a selected display lamp,
said decoder means including flash code memory means for storing a designated flash code for each display lamp and scanning means for sequentially addressing said memory means to read out each flash code in turn to said control means, and
an alphanumeric display including a plurality of multi-element devices, said decoder means including at least two registers for receiving first and second bytes of said flash code messages, said first byte designating the address of either a display lamp or an alphanumeric device and said second byte designating the flash code or element selection code associated with the selected lamp or device.

19. An operator console as defined in claim 18, wherein said detector means further includes first means responsive to a display lamp address in said first byte for writing the flash code from said second byte into said memory means at the storage location therein designated by said address.

20. An operator console as defined in claim 19, wherein said decoder means further includes second means responsive to an address of an alphanumeric device in said first byte for inhibiting said first means.

21. An operator console as defined in claim 20, including means responsive to the address of an alphanumeric device in said first byte for energizing the address device in accordance with the element selection code in said second byte.

22. An operator console as defined in claim 21, wherein said decoder means further includes address selector means for alternately applying to said flash code memory means the address from said first byte of said flash code meassage and the output of said scanning means so as to interleave the writing of new flash codes into said memory means and the sequential reading of stored flash codes from said memory means.

* * * * *